United States Patent
Higuchi

(10) Patent No.: US 9,967,483 B2
(45) Date of Patent: May 8, 2018

(54) IMAGE PICKUP APPARATUS WITH FLASH BAND COMPENSATION TECHNIQUE, CONTROL METHOD THEREFOR, AND STORAGE MEDIUM

(71) Applicant: CANON KABUSHIKI KAISHA, Tokyo (JP)

(72) Inventor: Daisuke Higuchi, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/614,765

(22) Filed: Jun. 6, 2017

(65) Prior Publication Data
US 2017/0359533 A1    Dec. 14, 2017

(30) Foreign Application Priority Data

Jun. 13, 2016 (JP) ................................ 2016-117067

(51) Int. Cl.
| | |
|---|---|
| G03B 15/02 | (2006.01) |
| H04N 5/357 | (2011.01) |
| H04N 5/235 | (2006.01) |
| H04N 5/353 | (2011.01) |
| G06T 1/00 | (2006.01) |

(52) U.S. Cl.
CPC ........... *H04N 5/3572* (2013.01); *H04N 5/235* (2013.01); *H04N 5/3532* (2013.01); *G06T 1/0007* (2013.01)

(58) Field of Classification Search
USPC ..................................................... 396/61, 62
See application file for complete search history.

(56) References Cited

U.S. PATENT DOCUMENTS

| | | | | |
|---|---|---|---|---|
| 2,953,978 | A * | 9/1960 | Rentschler | G03B 7/06 396/294 |
| 5,809,161 | A * | 9/1998 | Auty | G01P 3/38 340/937 |
| 8,243,790 | B2 * | 8/2012 | Leontaris | H04N 19/105 375/240.02 |
| 2012/0188403 | A1 * | 7/2012 | Gomita | H04N 5/2351 348/226.1 |
| 2013/0208149 | A1 * | 8/2013 | Kamiya | H04N 5/217 348/241 |
| 2014/0232908 | A1 * | 8/2014 | Kishida | H04N 5/2173 348/241 |

FOREIGN PATENT DOCUMENTS

JP     2011-066567 A    3/2011

* cited by examiner

*Primary Examiner* — Clayton E Laballe
*Assistant Examiner* — Warren K Fenwick
(74) *Attorney, Agent, or Firm* — Cowan, Liebowitz & Latman, P.C.

(57) ABSTRACT

An image pickup apparatus which is capable of, even when a flash band appears during a zooming operation, properly compensating for the flash band to generate a post-compensation image having no different levels of luminance. A lens unit has a zoom function. Image information generated based on image signals output from an image pickup device, which sequentially starts exposure and sequentially reads out signals for each row of pixels, is held in a memory unit. Based on the image information, the flash band caused by an external flash and extending across a plurality of frames is detected, and frames in which the flash band was detected are corrected to obtain an image having no different levels of luminance. The frames are corrected according to a calculated zoom change ratio of the lens unit when the zoom change ratio does not fall inside a first range determined in advance.

8 Claims, 10 Drawing Sheets

IMAGE  AVERAGE LEVEL IN EACH ROW

FIRST FRAME

IMAGE  AVERAGE LEVEL IN EACH ROW

SECOND FRAME

IMAGE  AVERAGE LEVEL IN EACH ROW

THIRD FRAME

FIRST LEVEL DIFFERENCE
DIFFERENCE BETWEEN SECOND FRAME
AND FIRST FRAME

SECOND LEVEL DIFFERENCE
DIFFERENCE BETWEEN THIRD FRAME
AND SECOND FRAME

FIRST FRAME

SECOND FRAME

THIRD FRAME

FIRST LEVEL DIFFERENCE
DIFFERENCE BETWEEN SECOND FRAME
AND FIRST FRAME

SECOND LEVEL DIFFERENCE
DIFFERENCE BETWEEN THIRD FRAME
AND SECOND FRAME

IMAGE PICKUP APPARATUS WITH FLASH BAND COMPENSATION TECHNIQUE, CONTROL METHOD THEREFOR, AND STORAGE MEDIUM

BACKGROUND OF THE INVENTION

Field of the Invention

The present invention relates to an image pickup apparatus such as a digital camera or a digital video camera, a control method therefor, and a storage medium, and in particular, to improvements in flash band compensation technique.

Description of the Related Art

Some image pickup apparatuses such as a digital camera have a rolling shutter image pickup device which sequentially starts exposure and sequentially reads out signals in each row of pixels. Such image pickup apparatuses have a problem that a flash band that creates different levels of luminance appearing in an image in one frame due to an external flash.

Conventionally, there has been proposed a technique to, for a frame where a flash band was detected, compensate for the flash band to generate an image with no different levels of luminance by using a frame immediately preceding the frame or finding an average of a plurality of frames preceding and succeeding the frame (Japanese Laid-Open Patent Publication (Kokai) No. 2011-66567).

According to Japanese Laid-Open Patent Publication (Kokai) No. 2011-66567 above, however, when flash band compensation is performed during a zooming operation, a compensated image with no different levels of luminance cannot be generated because a size of a subject image in frames that are used for the flash band compensation varies.

SUMMARY OF THE INVENTION

The present invention provides an image pickup apparatus and a control method therefor which are capable of, even when a flash band appears during a zooming operation, properly compensating for the flash band to generate a compensated image with no different levels of luminance, as well as a storage medium.

Accordingly, the present invention provides an image pickup apparatus comprising a lens unit configured to have a zoom function, an image pickup device configured to sequentially start exposure and sequentially read out signals for each row of pixels, a signal processing unit configured to generate image information based on image signals output from the image pickup device, a storage unit configured to hold, in a memory unit, the image information generated by the signal processing unit, a detection unit configured to, based on the image information held in the memory unit, detect a flash band that is caused by an external flash and extending across a plurality of frames, a correction unit configured to correct the frames in which the flash band was detected by the detection unit to an image having no different levels of luminance; and a calculation unit configured to calculate a zoom change ratio of the lens unit, wherein the correction unit corrects the frames according to the zoom change ratio when the calculated zoom change ratio does not fall inside a first range determined in advance.

According to the present invention, even when a flash band appears during a zooming operation, the flash band is properly compensated for to generate a compensated image with no different levels of luminance.

Further features of the present invention will become apparent from the following description of exemplary embodiments (with reference to the attached drawings).

DESCRIPTION OF THE EMBODIMENTS

Hereafter, embodiments of the present invention will be described with reference to the drawings.

Figure 1:
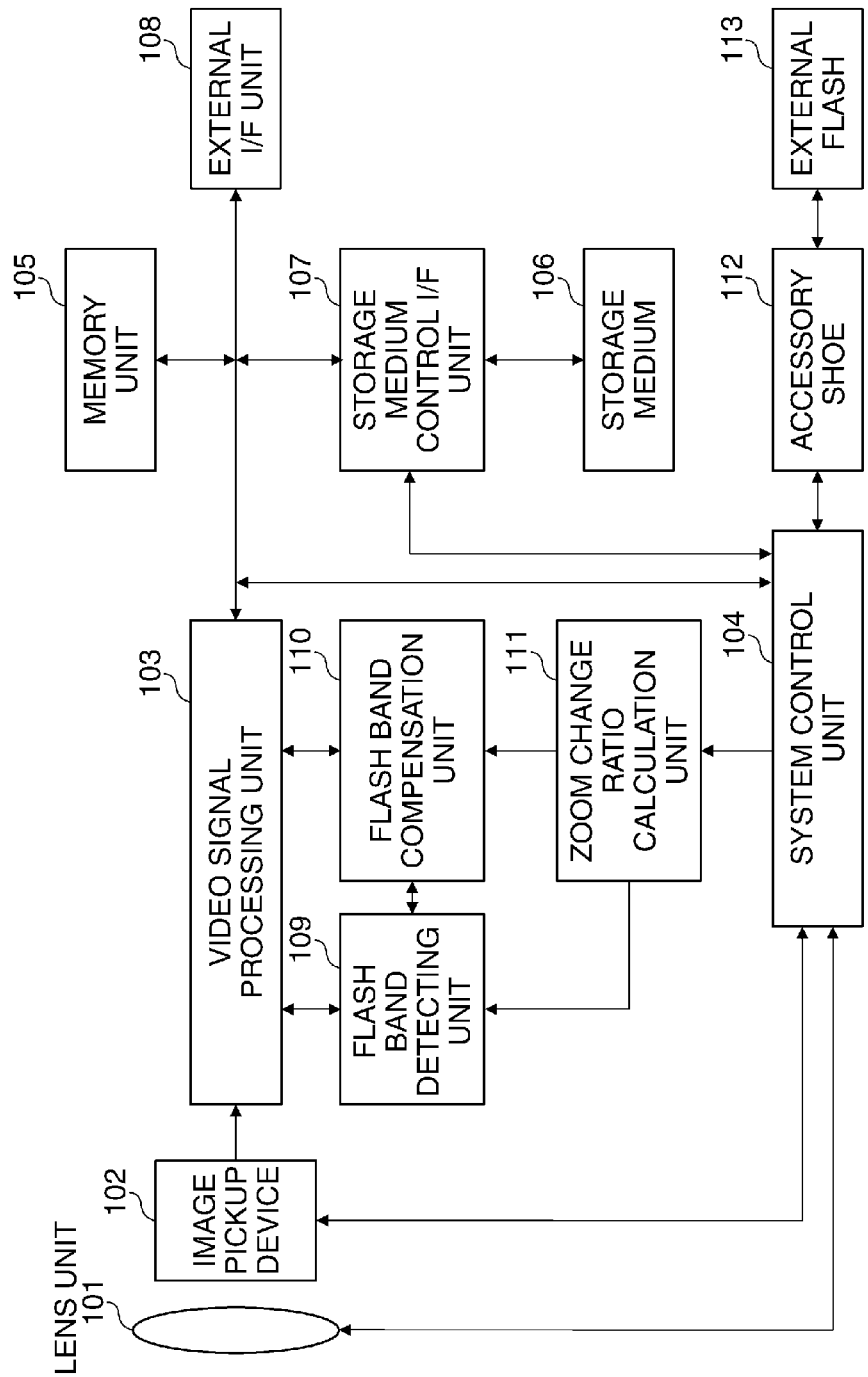
FIG. 1 is a block diagram showing a control system of a digital video camera that is a first embodiment of an image pickup apparatus according to the present invention.

FIG. 1 is a block diagram showing a control system of a digital video camera (hereafter referred to as the camera) that is a first embodiment of an image pickup apparatus according to the present invention. Referring to FIG. 1, a lens unit 101 has a diaphragm and an ND filter, which control an amount of incident light, and is comprised of a zoom-type lens unit that includes a zoom lens which moves in a direction of an optical axis at a time of zooming, and a focus lens which moves in the direction of the optical axis at a time of adjusting a focus (focusing). It should be noted that a zoom switch, which is for selecting zoom functions, and a zoom drive unit, which drives the zoom lens, are not shown in FIG. 1.

An image pickup device 102 is comprised of a CMOS sensor or the like, which sequentially starts exposure and sequentially reads out signals for each row of pixels, and photoelectrically converts an image of a subject formed through the lens unit 101 into an electric signal and outputs it as an image signal. A video signal processing unit 103 converts the image signal output from the image pickup device 102 into a video signal in a predetermined format.

A system control unit 104, which includes a CPU, a RAM, a ROM, and so forth, is responsible for controlling the entire camera. The system control unit 104 calculates an appropriate exposure based on an output signal from the video signal processing unit 103 and controls the diaphragm and the ND filter of the lens unit 101, the zoom drive unit, shutter speed of the image pickup device 102, and by extension, values of gain to be multiplied by the video signal processing unit 103. The shutter speed here means an exposure time of an electronic shutter and is controlled by the system control unit 104 sending electric charge accumulation start timing and electric charge readout timing to the image pickup device 102.

A memory unit 105 temporarily holds and stores a result of computation by the system control unit 104 and an output signal from the video signal processing unit 103. A storage medium 106 is a memory card, a DVD, a hard disk, a nonvolatile memory, or the like. A storage medium control I/F unit 107 controls input and output of data to and from the storage medium 106. An external I/F unit 108 outputs captured video to an external monitor or recorder and inputs video from another video camera or a player. The camera is able to connect with a computer via the external I/F unit 108 and obtain necessary information via the computer and the Internet.

A flash band detection unit 109 uses image information on consecutive two frames held in the memory unit 105 to detect an area where a flash band appears. A flash band compensation unit 110 compensates for a flash band to generate an overall flash image by combing an image in a frame which is stored in the memory unit 105 and in which a flash band was detected with an image in a frame immediately preceding the frame.

A zoom change ratio calculation unit 111 calculates a zoom change ratio based on information on the zoom lens obtained from the system control unit 104 and sends a result of the calculation to the flash band detection unit 109 and the flash band compensation unit 110. An external flash 113 is removably mounted on a camera via am accessory shoe 112.

Figure 2:
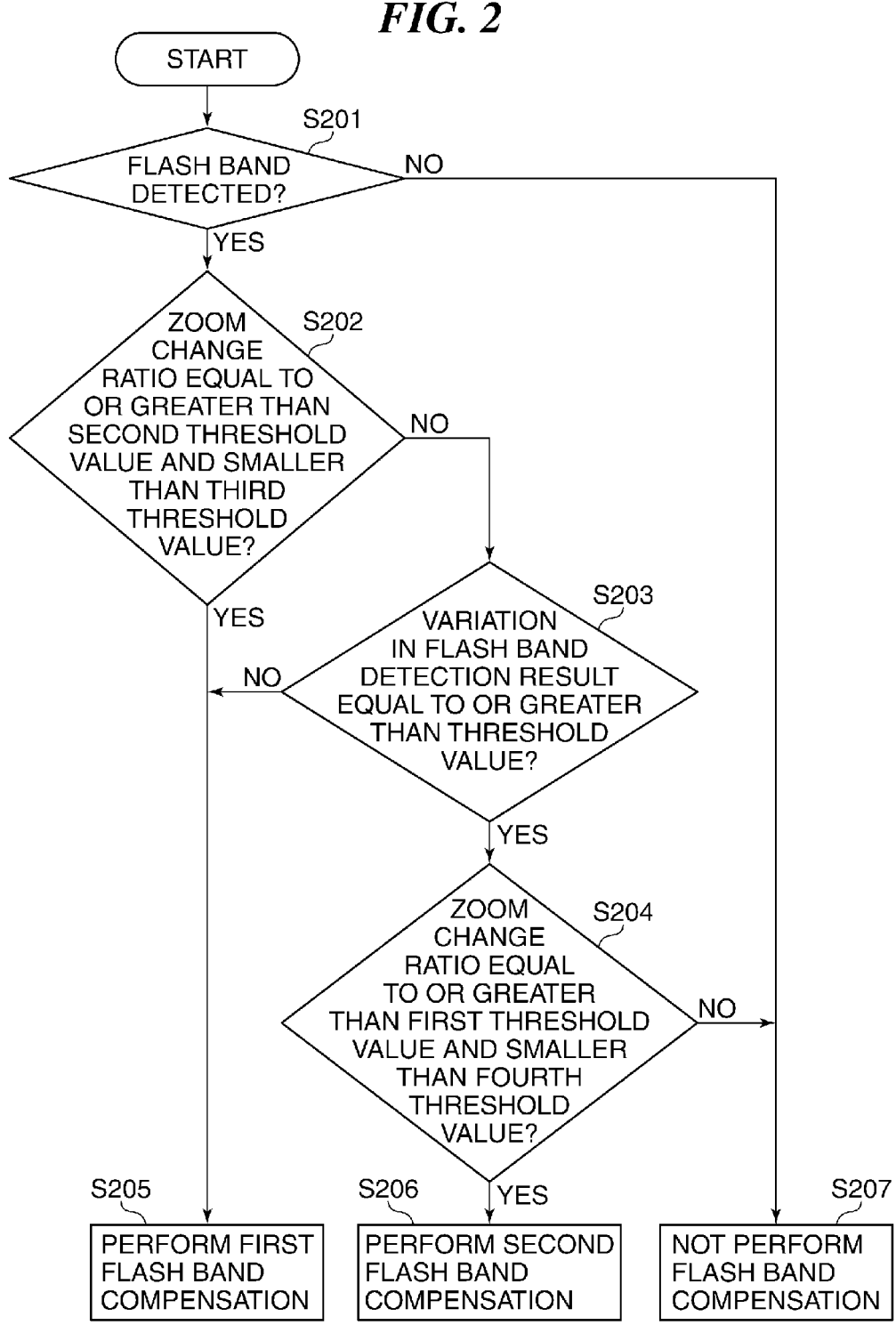
FIG. 2 is a flowchart useful in explaining a process in which a flash band compensation method is changed according to a zoom change ratio.

Referring next to FIG. 2, a description will be given of a process in which the way of flash band compensation is changed according to a zoom change ratio. Processes in FIG. 2 are carried out by a CPU or the like executing programs stored in the ROM or the like of the system control unit 104 and expanded into the RAM.

Referring to FIG. 2, in step S201, the system control unit 104 determines whether or not a flash (external flash) was fired by the external flash 113 during shooting, and the flash band detection unit 109 detected a flash band. When the system control unit 104 determines that a flash band was detected, the process proceeds to step S202, and when the system control unit 104 determines that no flash band was detected, the process proceeds to step S207. It should be noted that how to detect a flash band will be described later in detail with reference to FIGS. 3A to 3E.

In the step S202, the system control unit 104 determines whether or not a zoom change ratio obtained from the zoom change ratio calculation unit 111 by the flash band compensation unit 110 is equal to or greater than a second threshold value and smaller than a third threshold value. When the zoom change ratio is equal to or greater than the second threshold value and smaller than the third threshold value, the system control unit 104 determines that a subject size does not vary on appearance, and the process proceeds to step S205, and when not, the process proceeds to step S203. Here, a range where the zoom change ratio is equal to or greater than the second threshold value and smaller than the third threshold value corresponds to an exemplary first range of the present invention. It should be noted that here, the second threshold value and the third threshold value for the zoom change ratio will be described in detail with reference to FIG. 5.

In the step S203, the system control unit 104 determines whether or not a variation in flash band detection result obtained in the step S201 is equal to or greater than a threshold value. When the system control unit 104 determines that the variation in flash band detection result is equal to or greater than the threshold value, the process proceeds to step S204, and when not, the system control unit 104 determines that the subject size does not vary on appearance, and the process proceeds to the step S205. It should be noted that the variation in flash band detection result will be described later in detail with reference to FIGS. 4A to 4E.

In the step S204, the system control unit 104 determines whether or not the zoom change ratio obtained from the zoom change ratio calculation unit 111 by the flash band compensation unit 110 is equal to or greater than a first threshold value and smaller than a fourth threshold value. When the zoom change ratio is equal to or greater than the first threshold value and smaller than the fourth threshold value, the process proceeds to step S206, and when not, the system control unit 104 determines that the zooming magnification has changed to a predetermined value or more and it is impossible to generate an appropriate compensated image, and the process proceeds to step S207. Here, the range where the zoom change ratio is equal to or greater than the first threshold value and smaller than the fourth threshold value corresponds to an exemplary second range of the present invention. It should be noted that here, the first threshold value and the fourth threshold value for the zoom change ratio will be described in detail with reference to FIG. 5.

In the step S205, the system control unit 104 causes the flash band compensation unit 110 to perform first flash band compensation for which no consideration is given to the zoom change ratio, and ends the process. The first flash band compensation here will be described in detail with reference to FIG. 6.

In the step S206, the system control unit 104 causes the flash band compensation unit 110 to perform second flash band compensation according to the zoom change ratio, and ends the process. The second flash band compensation here will be described in detail with reference to FIG. 7.

In the step S207, the system control unit 104 does not cause the flash band compensation unit 110 to perform flash band compensation, but outputs the input image as it is and ends the process.

Referring next to FIGS. 3A to 3E, a description will be given of how to detect a flash band in the step S201 in FIG. 2. In an example shown in FIGS. 3A to 3E, there is a subject at a center of an image, and a flash band appears in a lower part of a second frame and an upper part of a third frame.

Figure 3A:
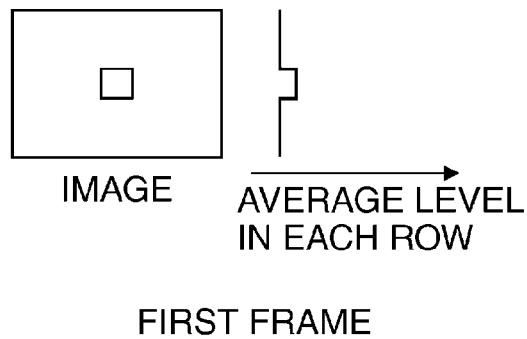
FIGS. 3A to 3E are diagrams useful in explaining how a flash band is detected in step S201 in FIG. 2.
Figure 3B:
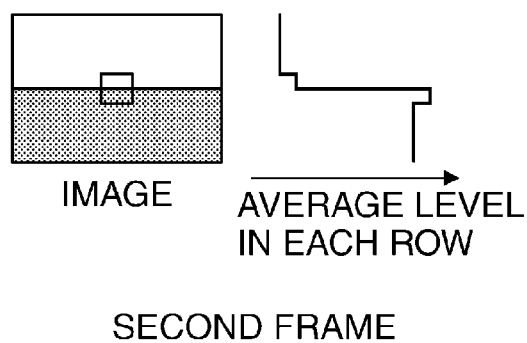
Figure 3C:
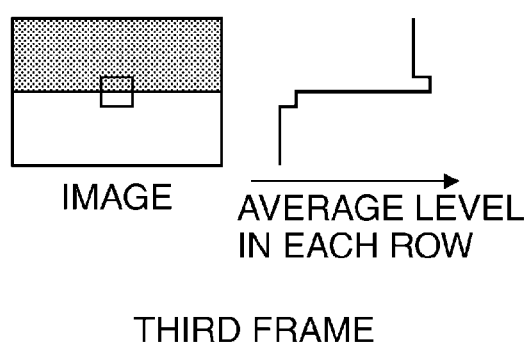
Figure 3D:
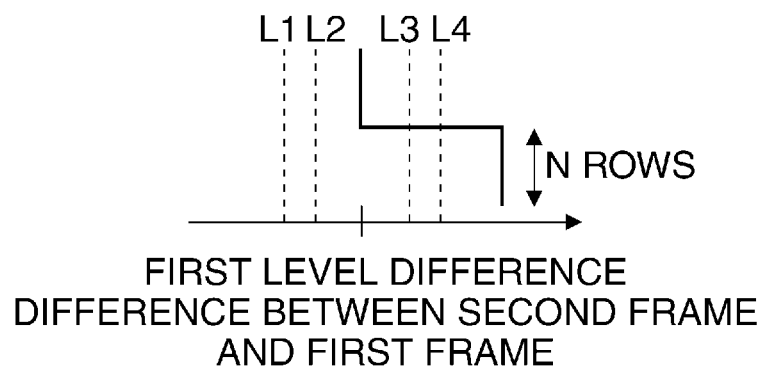
Figure 3E:
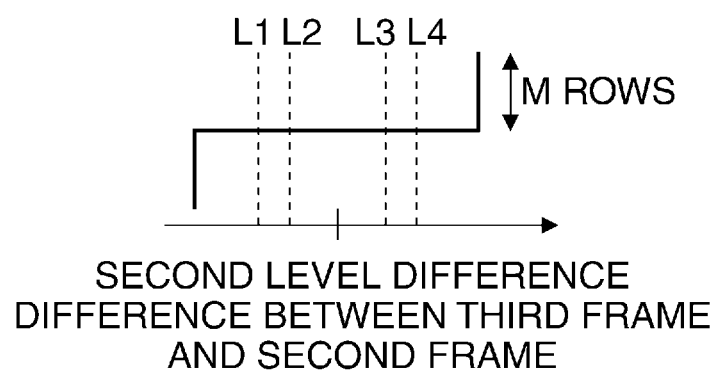

First, as shown in FIGS. 3A to 3C, the system control unit 104 calculates average levels in respective rows for images in first to third frames. Next, as shown in FIG. 3D, the system control unit 104 calculates differences (hereafter referred to as the first level differences) in the average levels in the respective rows between the images in the second frame and the first frame. As shown in FIG. 3E, the system control unit 104 also calculates differences (hereafter referred to as the second level differences) in the average levels in the respective rows between the images in the third frame and the second frame.

Next, when first to third conditions described below are satisfied, the system control unit 104 determines that a flash band was detected.

The first condition is that values of the first level differences are equal to or greater than a threshold value L4 in consecutive n rows from a lower end and are equal to or greater than a threshold value L2 and smaller than a threshold value L3 in the other rows.

The second condition is that values of the second level differences are equal to or greater than the threshold value L4 in consecutive m rows from an upper end and are smaller than a threshold value L1 in the other rows.

The third condition is that n+m corresponds to the total number of rows in one frame.

When all of the first to third conditions are satisfied, the system control unit 104 determines in the step S201 in FIG. 2 that a flash band was detected. It is assumed here that the threshold values L1 to L4 have the following relationship: the threshold value L1<the threshold value L2<the threshold value L3<the threshold value L4.

Referring next to FIGS. 4A to 4E, a description will be given of a variation in flash band detection result obtained in the step S203 in FIG. 2.

In an example shown in FIGS. 4A to 4E, there is a subject at a center of an image, and a flash band appears in a lower part of a second frame and an upper part of a third frame. In the example shown in FIGS. 4A to 4E, a size of a subject varies from frame to frame.

Figure 4A:
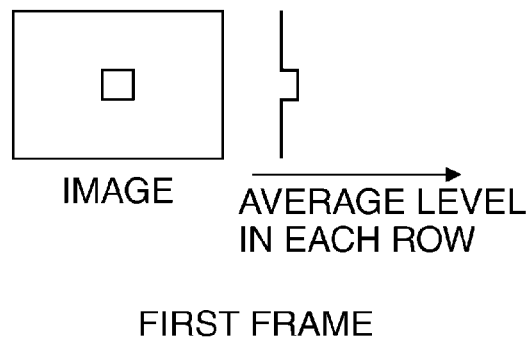
FIGS. 4A to 4E are diagrams useful in explaining variations in flash band detection results in step S203 in FIG. 2.
Figure 4B:
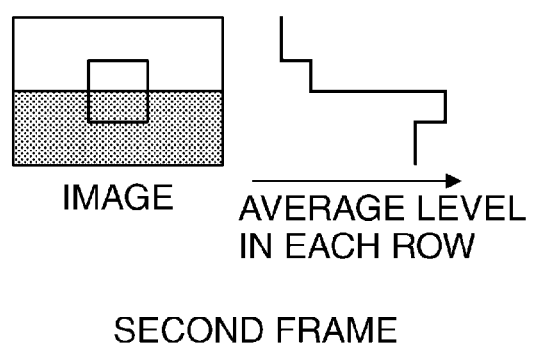
Figure 4C:
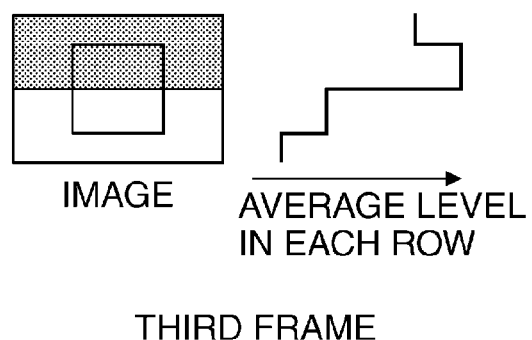
Figure 4D:
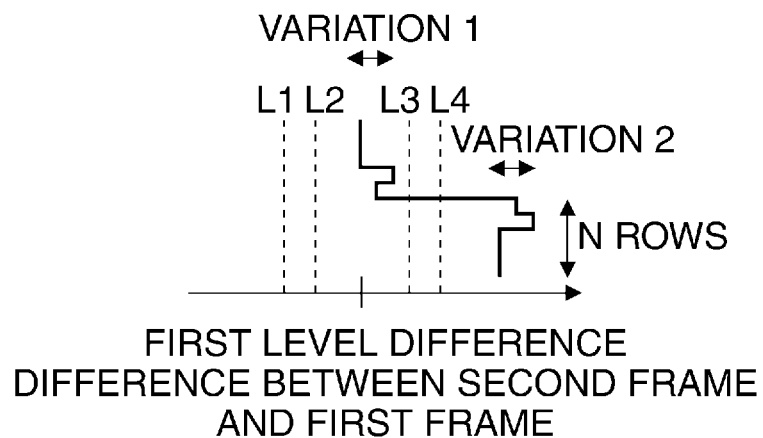
Figure 4E:
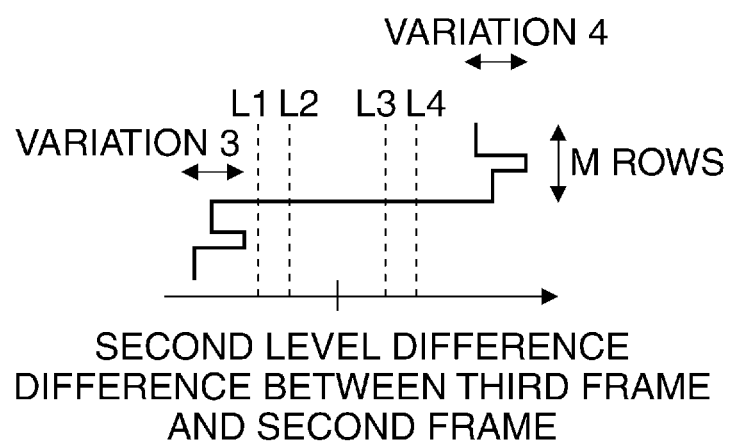

Average levels in respective rows in FIGS. 4A to 4C are calculated in the same manner as in FIGS. 3A to 3C. The first level differences and the second level differences in FIGS. 4D and 4E are also calculated in the same manner as in FIGS. 3D and 3E. Values of the first level differences in FIG. 4D are equal to or greater than the threshold value L4 in consecutive n rows from a lower end and are equal to or greater than the threshold value L2 and smaller than the threshold value L3 in the other rows. Values of the second level differences in FIG. 4E are equal to or greater than the threshold value L4 in consecutive m rows from an upper end and are smaller than the threshold value L1 in the other rows.

Moreover, n+m corresponds to the total number of rows in one frame, and hence in the example shown in FIGS. 4A to 4E, it is determined that a flash band was detected. In this case, a value of a variation in flash band detection result is obtained in a manner described hereafter.

As to the first level differences, it is assumed that in a region other than a flash band starting row or ending row in a region equal to or greater than the threshold value L2 and smaller than the threshold value L3, a difference between a maximum value and a minimum value is a variation 1. Also, as to the first level differences, it is assumed that in a region other than the flash band starting row or ending row in a region equal to or greater than the threshold value L4, a difference between a maximum value and a minimum value is a variation 2.

As to the second level differences, it is assumed that in a region other than the flash band starting (or ending) row in a region smaller than the threshold value L1, a difference between a maximum value and a minimum value is a variation 3. Also, as to the second level differences, it is assumed that in a region other than the flash band starting (or ending) row in a region equal to or greater than the threshold value L4, a difference between a maximum value and a minimum value is a variation 4.

Here, the system control unit 104 regards the greatest value among the variations 1 to 4 as a value of a variation in flash band detection result and determines whether or not this value of the variation is equal to or greater than a threshold value. When the value of the variation is smaller than the threshold value, the system control unit 104 determines that even when the zoom magnification is changed, a distance from the lens unit 101 to the subject changes accordingly, and hence the size of the subject does not change relative to a shooting angle of view, followed by the process proceeding to the step S205 in FIG. 2. Thus, by referring to the variation in flash band detection result, it is possible to properly compensate for the flash band with no consideration given to the zoom change ratio.

Figure 5:
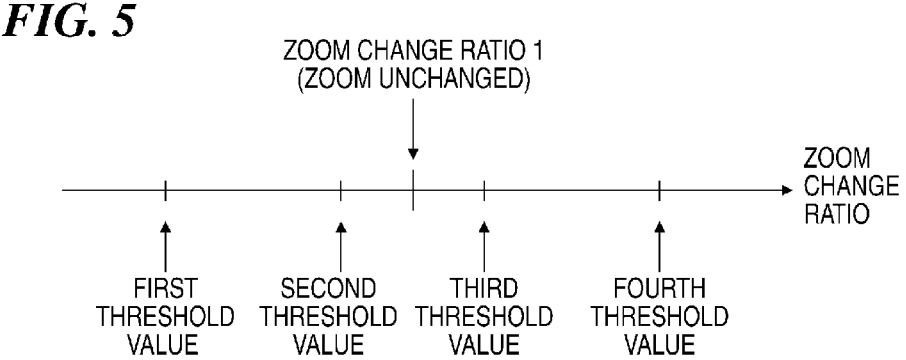
FIG. 5 is a diagram useful in explaining threshold values for a zoom change ratio referred to in steps S202 and S204 in FIG. 2.

Referring next to FIG. 5, a description will be given of threshold values for the zoom change ratio which are referred to in the step S202 and the step S204 in FIG. 2.

The zoom change ratio is a ratio of change in zoom magnification, and more specifically, a ratio in focal length between two frames. Assuming that an original image which is used for compensation by the flash band compensation unit 110 is an image in an immediately preceding frame, a value of the zoom change ratio is calculated by "focal length in present frame/focal length in immediately preceding frame". Assuming that an original image which is used for compensation by the flash band compensation unit 110 is an image in the second to the last frame, a value of the zoom change ratio is calculated by "focal length in present frame/ focal length in second to last frame".

When a zooming operation is not being performed, the focal length is unchanged, and hence the zoom change ratio is 1. During zooming-out, the zoom change ratio is smaller than 1, and during zooming-in, the zoom change ratio is greater than 1.

The threshold values have the following relationship: a first threshold value<a second threshold value<a third threshold value<a fourth threshold value.

A minimum zoom change ratio at which flash band compensation by the flash band compensation unit 110 is possible is set as the first threshold value. For example, in a case where an image is generated by reducing an original image using redundant pixels outside effective pixels during flash band compensation, a minimum value at which a sufficient amount of redundant pixels outside the effective pixels are ensured is set as the first threshed value.

A minimum value at which the subject size does not change on appearance is set as the second threshold value. A maximum value at which the subject size does not change on appearance is set as the third threshold value. A maximum zoom change ratio at which flash band compensation by the flash band compensation unit 110 is possible is set as the fourth threshold value. For example, in a case where an image is generated by enlarging an original image during flash band compensation, a maximum value at which a quality of a generated image presents no problem is set as the fourth threshed value.

Figure 6:
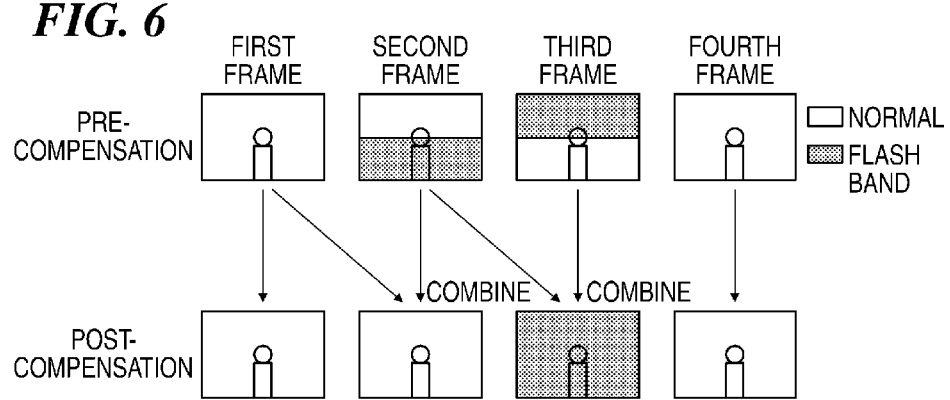
FIG. 6 is a diagram useful in explaining first flash band compensation in step S205 in FIG. 2.

FIG. 6 is a diagram useful in explaining the first flash band compensation in the step S205 in FIG. 2. FIG. 6 shows an example in which a flash band appears in a second frame and a third frame while a size of a subject is unchanged. A description will now be given of how a post-compensation image is generated for each frame.

No flash band appears in a pre-compensation image in a first frame, and hence this image is output as it is as a post-compensation image.

A flash band appears in a lower part of a pre-compensation image in the second frame. In this case, an image obtained by combining an upper part of the image in the second frame in which no flash band appears with a lower part of the image in the first frame in which no flash band appears is output as a post-compensation image.

A flash band appears in an upper part of a pre-compensation image in the third frame. In this case, an image obtained by combining the upper part of the image in the third frame in which the flash band appears with the lower part of the image in the second frame in which the flash band appears is output as a post-compensation image.

No flash band appears in a pre-compensation image in a fourth frame, and hence this image is output as it is as a post-compensation image.

Figure 7:
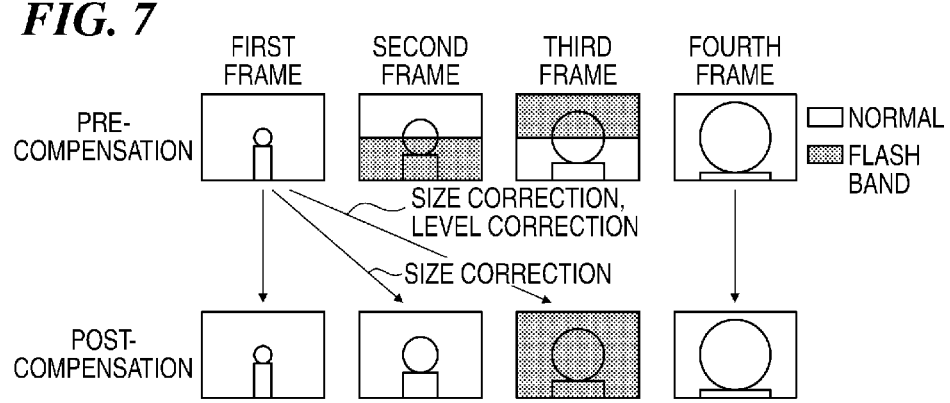
FIG. 7 is a diagram useful in explaining second flash band compensation in step S206 in FIG. 2.

FIG. 7 is a diagram useful in explaining the second flash band compensation in the step S206 in FIG. 2. FIG. 7 shows an example in which a flash band appears in a second frame and a third frame while a size of a subject changes. A description will now be given of how a compensated image is generated for each frame.

No flash band appears in a pre-compensation image in a first frame, and hence this image is output as it is as a post-compensation image.

A flash band appears in a lower part of a pre-compensation image in the second frame. At this time, an image obtained by correcting a size of the image in the first frame, in which no flash band appears, by an amount corresponding to a zoom change ratio between the first frame and the second frame calculated by the zoom change ratio calculation unit 111 is output as a post-compensation image.

A flash band appears in an upper part of a pre-compensation image in the third frame. In this case, first, an image is generated by correcting a size of the image in the first frame, in which no flash band appears, by an amount corresponding to a zoom change ratio between the first frame and the third frame calculated by the zoom change ratio calculation unit 111. Next, an image obtained by correcting a level of the image by an amount corresponding to a level of the flash band that appears is output as a post-compensation image.

No flash band appears in a pre-compensation image in a fourth frame, and hence this image is output as it is as a post-compensation image.

As described above, in the present embodiment, it is possible to select an appropriate way of flash band compensation according to a zoom change ratio. For example, even when a size of a subject changes due to a zooming operation, a flash band is appropriately compensated for by changing a size of a post-compensation image with consideration given to a zoom change ratio. Also, when it is determined that it is impossible to generate an appropriate post-compensation image due to a zoom magnification having being changed by an amount not less than a predetermined value, flash band compensation is not performed, and therefore, erroneous compensation is prevented. As a result, even when a flash band appears during a zooming operation, the flash band is appropriately compensated for to generate a compensated image with no different levels of luminance.

Referring next to FIGS. 8 to 12, a description will be given of a camera that is a second embodiment of the image pickup apparatus according to the present invention. It should be noted that for elements corresponding to those of the first embodiment described above, the same figures and reference symbols are used in the following description of the present embodiment.

Figure 8:
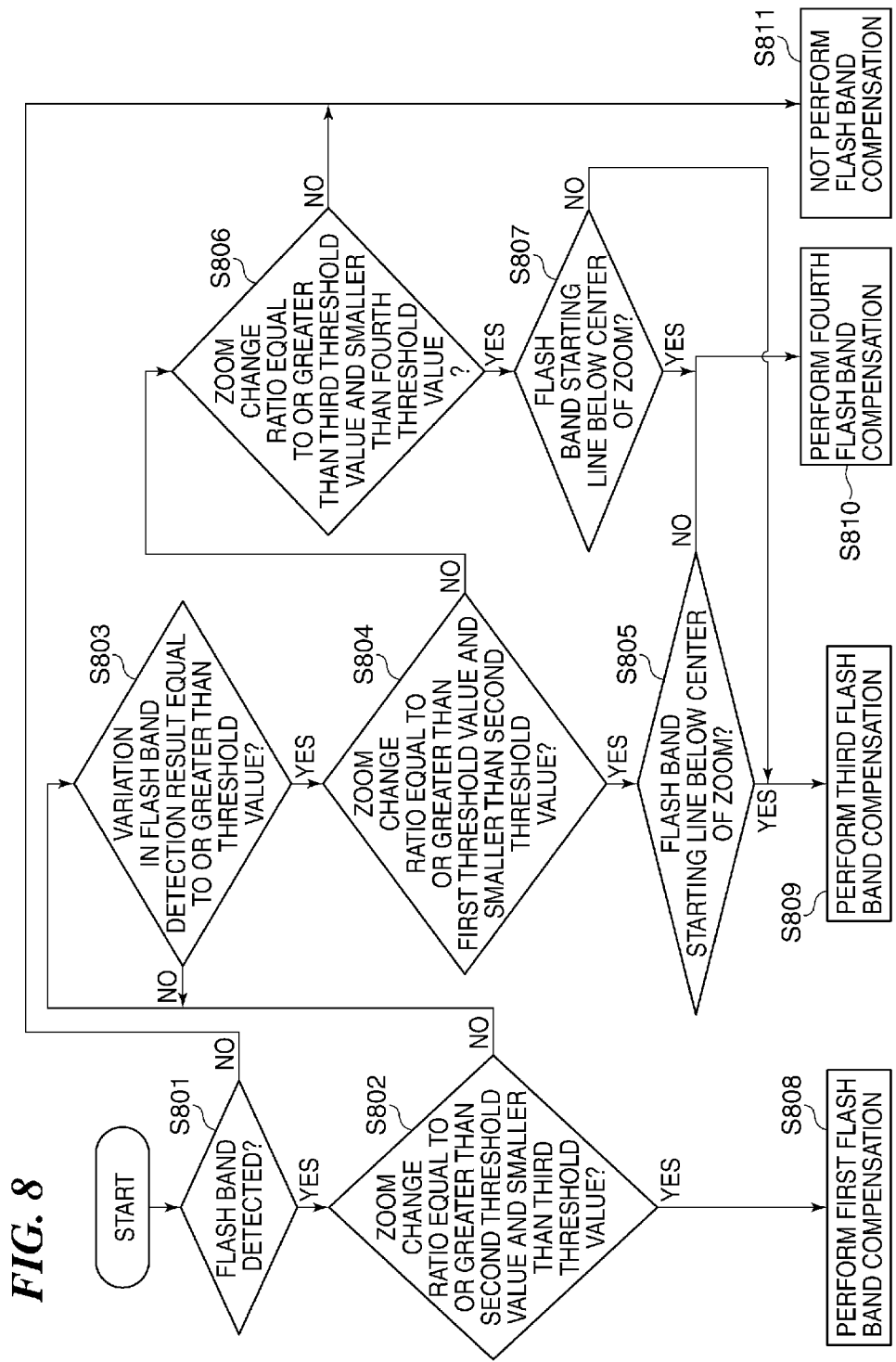
FIG. 8 is a flowchart useful in explaining a process in which a flash band compensation method is changed according to a relationship between a flash band starting (or ending) line and a center of zoom in a digital video camera that is a second embodiment of the image pickup apparatus according to the present invention.

FIG. 8 is a flowchart useful in explaining a process in which the way of flash band compensation is changed according to a relationship between a flash band starting (or ending) line and a center of zoom. Processes in FIG. 8 are carried out by a CPU or the like executing programs stored in the ROM or the like of the system control unit 104 and expanded into the RAM. It should be noted that processes in steps S801 to S803, S808, and S811 in FIG. 8 are the same as the steps S201 to S203, S205, and S207, respectively, in FIG. 2, and description thereof is omitted.

In step S804, the system control unit 104 determines whether or not the zoom change ratio is equal to or greater than the first threshold value and smaller than the second threshold value. When the zoom change ratio is equal to or greater than the first threshold value and smaller than the second threshold value, the process proceeds to step S805, and when not, the process proceeds to step S806.

In the step S805, the system control unit 104 determines whether or not the flash band starting (or ending) line is below the center of zoom. When the flash band starting (or ending) line is below the center of zoom, the process proceeds to step S809, and when not, the process proceeds to step S810.

In the step S806, the system control unit 104 determines whether or not the zoom change ratio is equal to or greater than the third threshold value and smaller than the fourth threshold value. When the zoom change ratio is equal to or greater than the third threshold value and smaller than the fourth threshold value, the process proceeds to step S807, and when not, the process proceeds to the step S811.

In the step S807, the system control unit 104 determines whether or not the flash band starting (or ending) line is below the center of zoom. When the flash band starting (or ending) line is below the center of zoom, the process proceeds to the step S810, and when not, the process proceeds to the step S809.

In the step S809, the system control unit 104 causes the flash band compensation unit 110 to perform third flash band compensation and ends the process. The third flash band compensation will be described later in detail with reference to FIG. 9 or FIG. 10.

In the step S810, the system control unit 104 causes the flash band compensation unit 110 to perform fourth flash band compensation and ends the process. The fourth flash band compensation will be described later with reference to FIG. 11 or FIG. 102.

Figure 9:
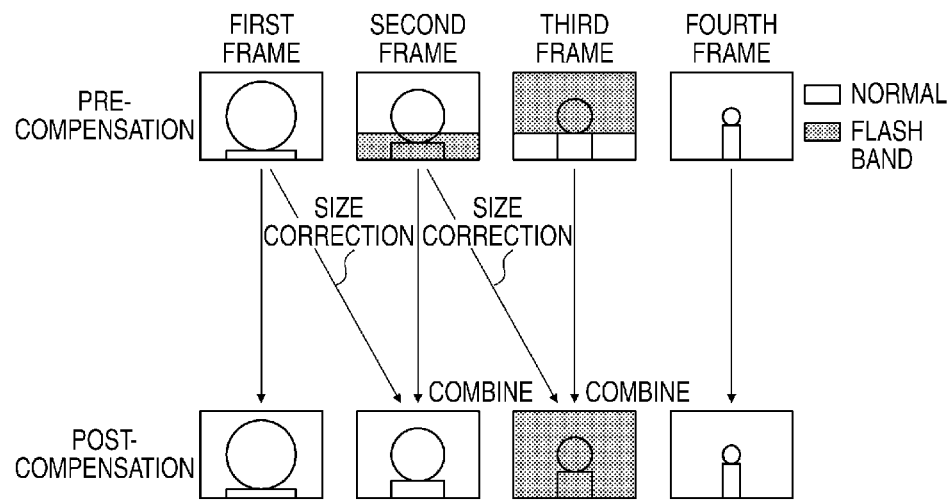
FIG. 9 is a diagram useful in explaining an example of third flash band compensation in step S809 in FIG. 8.

FIG. 9 is a diagram useful in explaining an example of the third flash band compensation in the step S809 in FIG. 8. In the example shown in FIG. 9, the zoom change ratio is equal to or greater than the first threshold value and smaller than the second threshold value, and the flash band starting (or ending) line is below the center of zoom.

As shown in FIG. 9, for an image in a first frame, compensation is not performed since no flash band appears, and the image is output as it is as a post-compensation image.

A flash band appears in an image in a second frame, and hence for the image in the second frame, a post-compensation image is generated by combining an image obtained by correcting a size of the image in the first frame by an amount corresponding to the zoom change ratio with an area where no flash band appears in the image in the second frame.

A flash band appears in an image in a third frame. For this reason, a post-compensation image is generated by combining an area where a flash band appears in an image obtained by correcting a size of the image in the second frame by an amount corresponding to the zoom change ratio with an area where the flash band appears in the image in the third frame. Areas where the flash bands appear in the second frame after size correction and the third frame overlap, and hence an image of one frame is generated by combining them together. It should be noted that conversely, an image of one frame cannot be generated merely by combining areas where no flash band appears.

For an image in a fourth frame, compensation is not performed since no flash band appears, and the image is output as it is as a post-compensation image.

Figure 10:
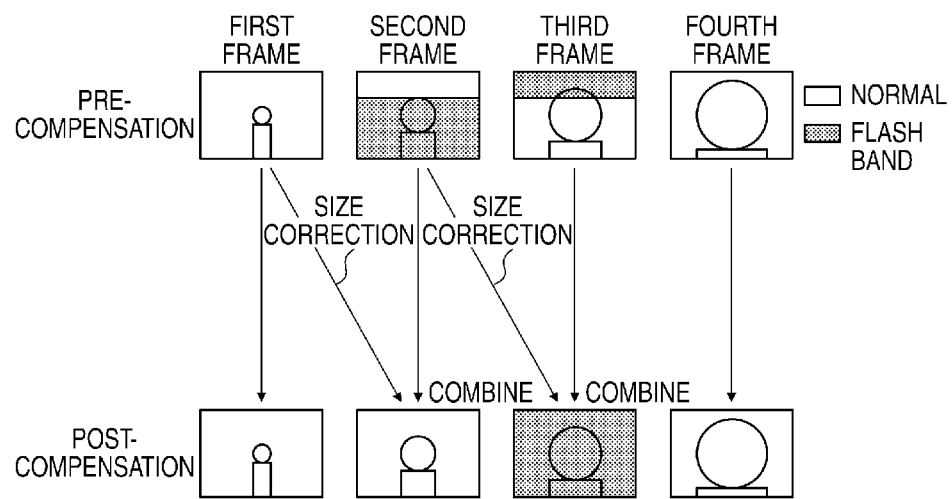
FIG. 10 is a diagram useful in explaining another example of the third flash band compensation in the step S809 in FIG. 8.

FIG. 10 is a diagram useful in explaining another example of the third flash band compensation in the step S809 in FIG. 8. In the example shown in FIG. 10, the zoom change ratio is equal to or greater than the third threshold value and smaller than the fourth threshold value, and the flash band starting (or ending) line is above the center of zoom.

As shown in FIG. 10, for an image in a first frame, compensation is not performed since no flash band appears, and the image is output as it is as a post-compensation image.

A flash band appears in an image in a second frame, and hence for the image in the second frame, a post-compensation image is generated by combining an image obtained by correcting a size of the image in the first frame by an amount corresponding to the zoom change ratio with an area where no flash band appears in the image in the second frame.

A flash band appears in an image in a third frame. For this reason, a post-compensation image is generated by combining an area where a flash band appears in an image obtained by correcting a size of the image in the second frame by an amount corresponding to the zoom change ratio with an area where the flash band appears in the image in the third frame. Areas where the flash bands appear in the second frame after size correction and the third frame overlap, and hence an image of one frame is generated by combining them together. It should be noted that conversely, an image of one frame cannot be generated merely by combining areas where no flash band appears.

For an image in a fourth frame, compensation is not performed since no flash band appears in it, and the image is output as it is as a post-compensation image.

Figure 11:
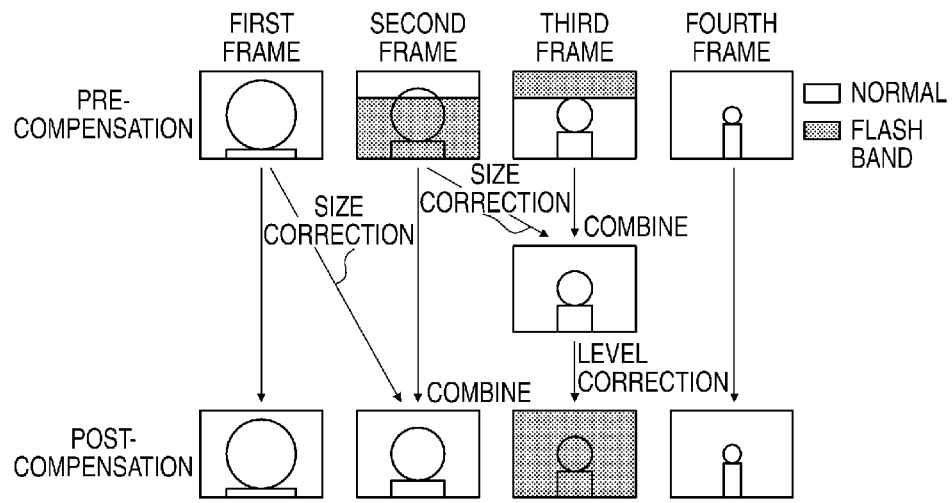
FIG. 11 is a diagram useful in explaining an example of fourth flash band compensation in step S810 in FIG. 8.

FIG. 11 is a diagram useful in explaining an example of the fourth flash band compensation in the step S810 in FIG. 8. In the example shown in FIG. 11, the zoom change ratio is equal to or greater than the first threshold value and smaller than the second threshold value, and the flash band starting (or ending) line is above the center of zoom.

As shown in FIG. 11, for an image in a first frame, compensation is not performed since no flash band appears, and the image is output as it is as a post-compensation image.

A flash band appears in an image in a second frame, and hence for the image in the second frame, a post-compensation image is generated by combining an image obtained by compensating a size of the image in the first frame by an amount corresponding to the zoom change ratio with an area where no flash band appears in the image in the second frame.

A flash band appears in an image in a third frame. For this reason, first, an area where no flash band appears in an image obtained by correcting a size of the image in the second frame by an amount corresponding to the zoom change ratio with an area where no flash band appears in the image in the third frame are combined together. Areas where no flash band appears in the second frame after size correction and the third frame overlap, and hence an image of one frame is generated by combining them together. It should be noted that conversely, an image of one frame cannot be generated merely by combining areas where the flash bands appear. Next, a level is corrected by multiplying the image, which has been obtained by the combination, by a gain corresponding to a level of the flash band to generate a post-compensation image.

For an image in a fourth frame, compensation is not performed since no flash band appears in it, and the image is output as it is as a post-compensation image.

Figure 12:
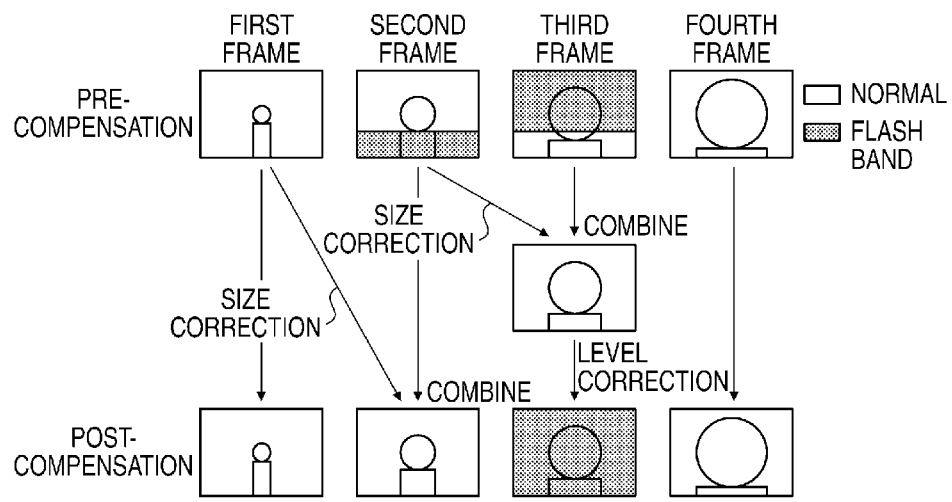
FIG. 12 is a diagram useful in explaining another example of the fourth flash band compensation in the step S810 in FIG. 8.

FIG. 12 is a diagram useful in explaining another example of the third flash band compensation in the step S810 in FIG. 8. In the example shown in FIG. 12, the zoom change ratio is equal to or greater than the third threshold value and smaller than the fourth threshold value, and the flash band starting (or ending) line is below the center of zoom.

As shown in FIG. 12, for an image in a first frame, compensation is not performed since no flash band appears, and the image is output as it is as a post-compensation image.

A flash band appears in an image in a second frame, and hence for the image in the second frame, a post-compensation image is generated by combining an image obtained by correcting a size of the image in the first frame by an amount corresponding to the zoom change ratio with an area where no flash band appears in the image in the second frame.

A flash band appears in an image in a third frame. For this reason, first, an area where no flash band appears in an image obtained by correcting a size of the image in the second frame by an amount corresponding to the zoom change ratio and an area where no flash band appears in the image in the third frame are combined together. Areas where no flash band appears in the second frame after size correction and the third frame overlap, and hence an image of one frame is generated by combining them together. It should be noted that conversely, an image of one frame cannot be generated merely by combining areas where the flash bands appear. Next, a level is corrected by multiplying the image, which has been obtained by the combination, by a gain corresponding to a level of the flash band to generate a post-compensation image.

For an image in a fourth frame, compensation is not performed since no flash band appears in it, and the image is output as it is as a post-compensation image.

As described hereinabove, in the present embodiment, an appropriate way of flash band compensation is selectable during a zoom operation according to the relationship between the flash band starting (or ending) line and the center of zoom. Particularly, when a compensation method in which images in two frames or more are combined together is used, even if the flash band starting (or ending) line deviates from that in another frame since sizes of some images have been corrected, it is possible to select an appropriate way of combining the images together.

Moreover, in the present embodiment, since compensation is performed based on newer frame information than in the first embodiment described above, dynamic resolution is improved. Further, in the first embodiment described above, it is necessary to correct a size according to the zoom change ratio of up to two frames, whereas in the present embodiment, it is only necessary to correct a size according to the zoom change ratio of up to one frame. This prevents image quality from being deteriorated due to zoom-in and reduces redundant pixels required for zoom-out. Moreover, assuming that image quality and the number of redundant pixels are equal, the zoom change ratio is allowed to be corrected to a larger extent. The other constructions and operational advantages are the same as those in the first embodiment described above.

It should be understood that the present invention is not limited to the embodiments described above, but the embodiments may be modified as appropriate without departing from the spirits of the present invention, and some of the embodiments described above may be combined together as appropriate.

For example, either the process in which the way of compensation is switched by referring to the zoom change ratio or the process in which the way of compensation is switched by referring to variations in flash band detection result may be carried out first according to a system configuration and a shooting situation.

Moreover, when determining whether or not a flash band was detected, the flash band detection unit 109 does not have to judge whether or not the number of rows in which threshold values for the first level differences and the second level differences are exceeded matches the number of rows in one frame. It may be determined that a flash band was detected as long as the number of rows is close to the number of rows in one frame because there may be a case where the number of rows does not reach the number of rows in one frame depending on the time period for which a flash is fired or how a firing level of a flash at the start or end of flash firing.

Furthermore, the present invention may be applied to a case where the flash band compensation unit 110 cannot perform compensation involving size correction such as the second to fourth flash band compensation. For example, in the first embodiment described above, whether or not to perform the first flash band compensation may be determined according to the zoom change ratio and variations in flash band detection result as long as such a setting as to never satisfy the conditions is made in the step S204 in FIG. 2. This prevents erroneous compensation resulting from flash band compensation when the zoom magnification has changed.

Moreover, the flash band detection unit 109 should not necessarily detect a flash band using the methods of the embodiments described above, but may detect a flash band using any method as long as it is possible to detect a flash band.

Variations in flash band detection result obtained by the flash band detection unit 109 should not be limited to those in the embodiments described above, but those variations may be anything as long as values change when a subject changes from frame to frame. Furthermore, the flash band compensation unit 110 should not necessarily compensate for a flash band using the methods of the embodiments described above, but may compensate for a flash band using any method as long as the same effects are achieved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-117067, filed Jun. 13, 2016 which is hereby incorporated by reference herein in its entirety.

What is claimed is:

1. An image pickup apparatus comprising:
a lens unit configured to have a zoom function;
an image pickup device configured to sequentially start exposure and sequentially read out signals for each row of pixels;
a signal processing unit configured to generate image information based on image signals output from the image pickup device;
a storage unit configured to hold, in a memory unit, the image information generated by the signal processing unit;
a detection unit configured to, based on the image information held in the memory unit, detect a flash band that is caused by an external flash and extending across a plurality of frames;
a correction unit configured to correct the frames in which the flash band was detected by the detection unit to an image having no different levels of luminance; and
a calculation unit configured to calculate a zoom change ratio of the lens unit,
wherein the correction unit corrects the frames according to the zoom change ratio when the calculated zoom change ratio does not fall inside of a predetermined first range.

2. The image pickup apparatus according to claim 1, wherein the correction unit does not correct the frames when the calculated zoom change ratio does not fall inside a second range broader than the first range.

3. The image pickup apparatus according to claim 1, wherein
the detection unit detects level differences between two frames, and
the correction unit determines whether to correct the frames according to the zoom change ratio based on variations in level differences between the two frames detected by the detection unit in an area other than a starting line or an ending line of the flash band.

4. The image pickup apparatus according to claim 3, wherein the correction unit does not correct the frames when values of the variations in level differences between the two frames are equal to or greater than a predetermined value.

5. The image pickup apparatus according to claim 3, wherein the correction unit corrects the frames according to the zoom change ratio when values of the variations in level difference between the two frames are equal to or greater than a predetermined value.

6. The image pickup apparatus according to claim 1, wherein the correction unit changes a correction method according to a relationship between a starting line or an ending line of the flash band and a center of zoom when correcting the frames according to the zoom change ratio.

7. A control method for an image pickup apparatus having a lens unit that has a zoom function, and an image pickup device that sequentially starts exposure and sequentially reads out signals for each row of pixels, comprising:
- a signal processing step of generating image information based on image signals output from the image pickup device;
- a storage step of holding, in a memory unit, the image information generated in the signal processing step;
- a detection step of, based on the image information held in the memory unit, detecting a flash band that is caused by an external flash and extending across a plurality of frames;
- a correcting step of correcting the frames in which the flash band was detected in the detection step to an image having no different levels of luminance; and
- a calculation step of calculating a zoom change ratio of the lens unit,
- wherein in the correction step, the frames are corrected according to the zoom change ratio when the calculated zoom change ratio does not fall inside of a predetermined first range.

8. A non-transitory computer-readable storage medium storing a program for causing a computer to execute steps of a control method for an image pickup apparatus having a lens unit that has a zoom function, and an image pickup device that sequentially starts exposure and sequentially reads out signals for each row of pixels, the control method comprising:
- a signal processing step of generating image information based on image signals output from the image pickup device;
- a storage step of holding, in a memory unit, the image information generated in the signal processing step;
- a detection step of, based on the image information held in the memory unit, detecting a flash band that is caused by an external flash and extending across a plurality of frames;
- a correcting step of correcting the frames in which the flash band was detected in the detection step to an image having no different levels of luminance; and
- a calculation step of calculating a zoom change ratio of the lens unit,
- wherein in the correction step, the frames are corrected according to the zoom change ratio when the calculated zoom change ratio does not fall inside of a predetermined first range.

* * * * *